(12) United States Patent
Yang (10) Patent No.: US 10,534,872 B2
(45) Date of Patent: Jan. 14, 2020

(54) PIPING DATA TRANSFORM METHOD AND SYSTEM

(71) Applicant: General Electric Company, Schenectady, NY (US)

(72) Inventor: Yanping Yang, Shanghai (CN)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 14/441,411

(22) PCT Filed: Jan. 21, 2015

(86) PCT No.: PCT/CN2015/071192
§ 371 (c)(1),
(2) Date: May 7, 2015

(87) PCT Pub. No.: WO2016/115690
PCT Pub. Date: Jul. 28, 2016

(65) Prior Publication Data
US 2016/0342715 A1 Nov. 24, 2016

(51) Int. Cl.
*G06F 17/50* (2006.01)
*G06F 3/0484* (2013.01)

(52) U.S. Cl.
CPC ...... *G06F 17/5009* (2013.01); *G06F 3/04842* (2013.01); *G06F 2217/34* (2013.01)

(58) Field of Classification Search
CPC .. G06F 17/5009; G06F 3/04842; G06F 17/50; G06F 2217/34; G06F 17/30005
USPC .......................................................... 703/9
See application file for complete search history.

(56) References Cited

U.S. PATENT DOCUMENTS

| 5,517,428 A | * | 5/1996 | Williams | G06F 17/509 700/83 |
| 5,715,587 A |   | 2/1998 | Ziu |  |
| 5,768,149 A | * | 6/1998 | Umney | G06F 17/50 703/1 |

(Continued)

FOREIGN PATENT DOCUMENTS

| CN | 102243683 A | * | 11/2011 |
| CN | 102262704 A |   | 11/2011 |

OTHER PUBLICATIONS

Berger, Laurent. "Design of subsea jumper and spool pipelines." (2014). pp. 1-7, 37-40, 58.*

(Continued)

*Primary Examiner* — Kamini S Shah
*Assistant Examiner* — John E Johansen
(74) *Attorney, Agent, or Firm* — Fletcher Yoder, P.C.

(57) ABSTRACT

A method includes accessing, via a processor, a first user selection relating to a location of a pipe segment of a piping model. The pipe segment includes data in a first format. The method includes accessing, via the processor, a second user selection relating to a point type based on a number of branches at the location of the pipe segment. The method includes determining, via the processor, a point associated with a route of the pipe segment. The point is based on the location and the point type. The route includes the point and at least one additional point. The method includes generating, via the processor, a representation of the route to be stored in a second format. The second format is associated with piping analysis.

17 Claims, 4 Drawing Sheets

(56) References Cited

U.S. PATENT DOCUMENTS

| 9,158,866 B2* | 10/2015 | Sato | G06F 17/50 |
| 2006/0279572 A1* | 12/2006 | Okada | G06F 17/50 |
| | | | 345/467 |
| 2008/0133151 A1 | 6/2008 | Bui et al. | |
| 2013/0006588 A1 | 1/2013 | Mulligan et al. | |
| 2015/0317413 A1* | 11/2015 | Georgescu | G06F 17/50 |
| | | | 703/1 |

OTHER PUBLICATIONS

Berger, Laurent. "Design of subsea jumper and spool pipelines." (2014). pp. 1-7, 37-40, 58. (Year: 2014).*

PCT Search Report and Written Opinion issued in connection with corresponding PCT Application No. PCT/CN2015/071192 dated Oct. 23, 2015.

* cited by examiner

PIPING DATA TRANSFORM METHOD AND SYSTEM

BACKGROUND

This application is a national stage of PCT Application No. PCT/CN2015/071192, entitled "PIPING DATA TRANSFORM METHOD AND SYSTEM", filed on Jan. 21, 2015, which is hereby incorporated by reference in its entirety.

Piping projects may be performed in fields such as the power, oil and gas, petrochemical, offshore, and nuclear industries. A variety of tools have been created to help in piping projects. For example, piping modeling tools may be used to create and/or model a piping system. As further example, a piping system may be analyzed using piping analysis tools. As it may be desirable to perform modeling and analysis on a piping system, it may be useful to provide improved methods to use the modeling software in conjunction with the analysis software.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory computer-readable medium has computer executable code stored thereon, the code including instructions to receive a first user selection related to a location of a pipe segment of a piping model, wherein the pipe segment includes a first data in a first format, receive a second user selection related to a point type based on a number of branches at the location of the pipe segment, determine a point associated with a route of the pipe segment, wherein the point is based on the location and the point type, wherein the route includes the point and at least one additional point, wherein the route corresponds to a second set of data to allow analysis of the pipe segment, and generate a representation of the route to be stored in a second format, wherein the second format is associated with a piping analysis model to allow analysis of the pipe segment.

In another embodiment, a method includes accessing, via a processor, a first user selection related to a location of a point of a pipe segment of a piping model, wherein the pipe segment includes a first data in a first format, accessing, via the processor, a second user selection related to a point type of the point, determining, via the processor, a route of points, wherein the route includes the point having the location and the point type, creating, via the processor, a second set of data in a second format using the route, wherein the second format is associated with a piping analysis model to enable analysis of the pipe segment.

In a further embodiment, an electronic device includes a graphical interface configured to display a pipe segment of a piping model, and a processor communicatively coupled to a memory, wherein the processor is configured to access a first user selection from the graphical interface relating to a location of the pipe segment, wherein the pipe segment includes first data in a first format, access a second user selection from the graphical interface relating to a point type based on a number of branches at the location of the pipe segment, determine a point associated with a route of the pipe segment, wherein the point is based on the location and the point type, wherein the route includes the point and at least one additional point, and generate a representation of the route to be stored in a second format, wherein the second format is associated with piping analysis.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods of transforming a piping model into an analysis model of a piping system. Typically, when developing a piping system, two dimensional and/or three dimensional models are created using software and/or hardware. For instance, three dimensional modeling may involve computer-aided design (e.g., CAD) to assist in the creation, modification, analysis, and/or optimization of a piping system. In particular, Unigraphics (U-G) (i.e., Siemens NX or NX Unigraphics), includes high end CAD software packages that enable design of three dimensional piping models. Additionally, AutoPIPE is a software tool that specializes in pipe analysis (e.g., stress and structure analysis). While AutoPIPE may enable importing of some 3D models, U-G may follow a different format. Further, even if the 3D modeling and the analysis software use a similar format (e.g., both use CAD files), important information may be missed and/or unimportant information may be imported when transferring data from the 3D models to the analysis software. This can have the undesirable effect of users rebuilding the 3D piping model in the analysis software. Accordingly, an embodiment of the present disclosure addresses the problems described above with a system and method that enables a user to transform pipe data in a model to analysis software.

Figure 1:
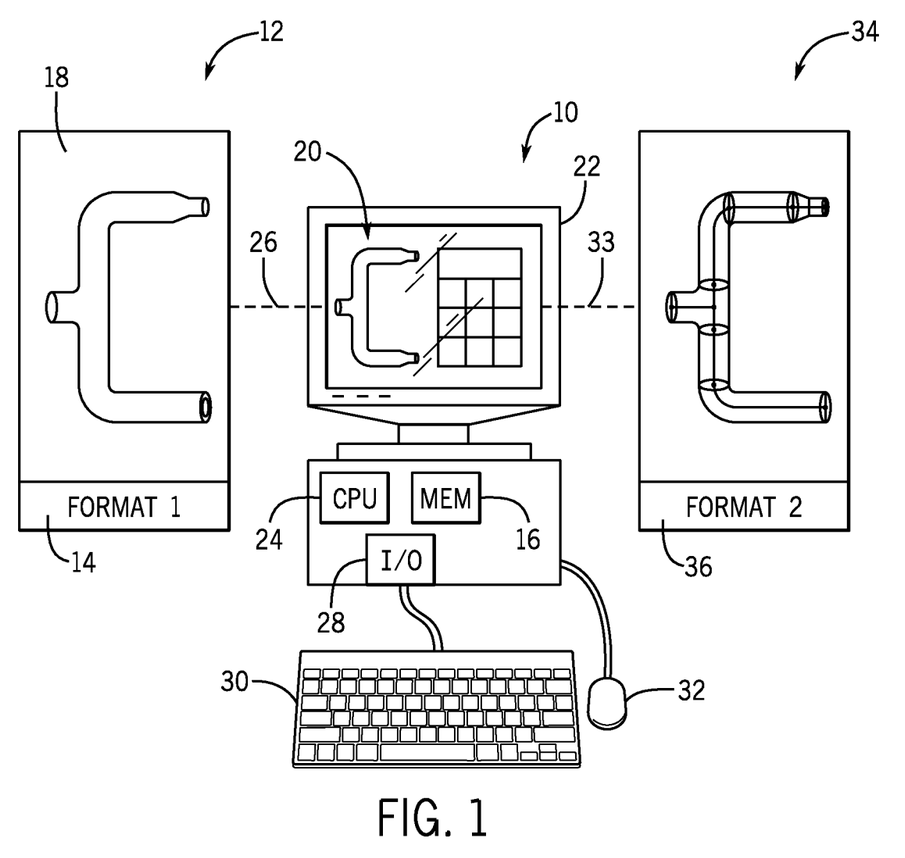
FIG. 1 is a block diagram of a system in accordance with an embodiment of the present disclosure.

With the foregoing in mind, FIG. 1 is a block diagram of a system 10 in accordance with an embodiment of the present disclosure. The system 10 may include a first set of data 12 having a first format 14 stored in a tangible non-transitory computer readable medium, such as a memory 16 of the system 10. While FIG. 1 illustrates the first set of data 12 as being separate (e.g., received) from the system 10, the first set of data 12 may be received, created, or stored as part of the system 10. The first set of data 12 may be stored as a first file in the memory 16 and/or be associated with a 3D piping model 18. While the 3D piping model 18 is shown as an illustrated model in FIG. 1, the first set of data 12 may store the model 18 in the memory 16 as objects, locations, data structures, tables, or any format suitable for use in a 3D modeling program. The first format 14 may be associated with the 3D modeling program, such as U-G. For instance, U-G may save files in a first format 14 (e.g., .prt format). The first format 14 may contain information about the 3D piping model 18, such as the objects used in building the model. The 3D piping model 18 may be constructed based on the first set of data 12 (e.g., data structures, objects, tables) as shown when the data is utilized in the 3D modeling program. If the first set of data 12 is saved as a file, a user may open the file using, for instance, U-G. Alternatively, the first set of data 12 of the 3D piping model 18 may be collected as the 3D piping model 18 is built using a graphical interface 20 of a display 22 of the system 10. The graphical interface 20 may enable a user to use various tools, views, and objects to build the 3D piping model 18. The system 10 may include a processor 24 to access 26 (e.g., load/open) the first set of data 12 in the memory 16.

The system 10 may include the processor 24 or multiple processors, the memory 16, and inputs/outputs (i.e., I/O) 28. The processor 24 may be operatively coupled to the memory 16 to execute instructions for carrying out the presently disclosed techniques. These instructions may be encoded in programs or code stored in a tangible non-transitory computer-readable medium, such as the memory 16 and/or other storage. The processor 24 may be a general purpose processor (e.g., processor of a desktop/laptop computer), system-on-chip (SoC) device, or application-specific integrated circuit, or some other processor configuration. The memory 16, in the embodiment, includes a computer readable medium, such as, without limitation, a hard disk drive, a solid state drive, diskette, flash drive, a compact disc, a digital video disc, random access memory (RAM), and/or any suitable storage device that enables the processor 24 to store, retrieve, and/or execute instructions and/or data. The memory 16 may include one or more local and/or remote storage devices. The system 10 may include a wide variety of inputs/outputs 28 (i.e. I/O). For instance, the I/O 28 may include a keyboard 30, a mouse 32, the display 22, and other components. The processor 24 of the system 10 may access 26 the first set of data 12 having the 3D piping model 18. The first set of data 12 may be stored/loaded into the memory 16 as a file, in the RAM, and/or another suitable method for the processor 24 to access 26.

Once the 3D piping model 18 has been access and/or loaded, first set of data 12 of the 3D piping model 18 may not include all of the data that is important when using piping analysis software, such as AutoPIPE. Accordingly, the 3D piping model 18 may then be transformed/converted to generate 33 (e.g., create) a second set of data 34 (e.g., saved as a second file in the memory 16) having a second format 36. While FIG. 1 illustrates the data as separate from the system, accessing 26 the first set of data 12 and/or generating 33 the second set of data 34 may take place on the system 10. The second set of data 34 may include information that is important when performing piping analysis in, for instance, AutoPIPE. In order to create the second set of data 34, a user may make user selections on the graphical interface 20 using the inputs/outputs (e.g., keyboard 30 and mouse 32).

Figure 2:
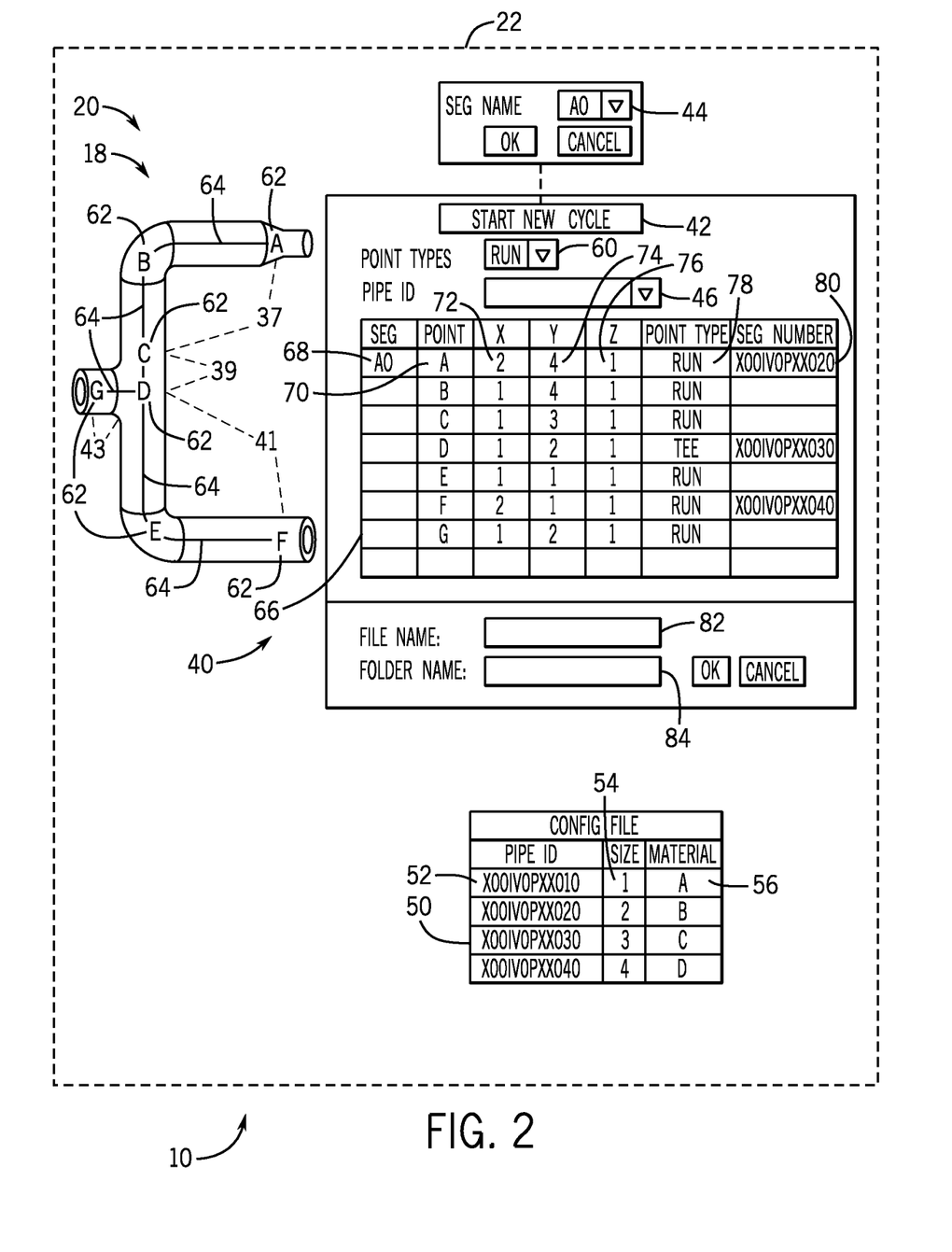
FIG. 2 is a block diagram of a graphical interface of the system of FIG. 1, in accordance with an embodiment of the present disclosure.

FIG. 2 is a graphical interface 20 on the display 22 of FIG. 1 consistent with an embodiment of the present disclosure. The process described below may be stored in the memory 16 of the system 10 and executed as instructions by the processor 24 (e.g., running code). The processor 24 may receive user selections of the graphical interface 20 via a capacitive touchscreen of the display 22, the mouse 32, the keyboard 30, or the like. The graphical interface 20 includes the 3D piping model 18 of the first set of data 12. The 3D piping model 18 may include one or more segments 38. A segment may include the entire piping model 18 shown or a portion (e.g., piping from A-C may be segment 37, piping from C-D may be a segment 39, piping from D-F may be a segment 41, and piping from D-G may be a segment 43). For instance, as explained above, the piping segment and/or the entire 3D piping model 18 may be created in a 3D modeling program. Once the 3D piping model 18 is created, the system 10 may include a point creator tool 40 for determining and/or storing the important information for performing piping analysis. The tool 40 may be stored in the memory 16. The tool 40 may include instructions (e.g., routines, functions, interrupts, etc.) which may be encoded in programs or code stored in a tangible non-transitory computer-readable medium, such as the memory 16 and/or other storage. The processor 24 of the system 10 may be configured to store, retrieve, and/or execute instructions associated with the tool 40. Further, the tool 40 may be incorporated (e.g., as an add-in) into the 3D modeling program.

The tool 40 may allow the processor 24 to receive user selections, such as locations, types, materials, or the like, of the 3D modeling program. As explained above, the processor 24 may then determine points associated with a route of the pipe segment, and generate a representation of the route in a format for piping analysis.

Specifically, the tool 40 may include a start new cycle button 42. A cycle may be used to determine information related to one or more segments. The start new cycle button 42 may open a pop-up for specifying a segment name 44. The segment name 44 may be a drop down field of names from a database, a text field, a spreadsheet, the memory 16, or the like. Alternatively, the segment name 44 may enable a user to enter the segment name in a text field. The processor 24 may receive a user selection of the segment name from the graphical interface 20. As such, the segment name may identify a segment. In some instances, such as that shown in FIG. 2, the piping segment AO may include the entire 3D piping model 18

Further, the processor 24 may receive a user selection of the Pipe ID 46 from the graphical interface 20. The processor 24 may utilize the Pipe ID 46 to determine a size, material, or other characteristics associated with the piping segment. The tool 40 may include a field for a user to make user selections of a type of the pipe, such as a Pipe ID 46. The system 10 may use be a drop down, a list, table, or any method suitable for selecting the Pipe ID 46. For instance, a drop down list may be associated with a database, excel spreadsheet, text file, configuration file 50, table, or any method suitable for storing various ways of identifying different types of piping. The pipe data may be stored in the memory 16, or any suitable method for adding, storing, updating, and/or deleting pipe data. The pipe data of the configuration file 50 may include piping identification 52 (e.g., an X number and/or Pipe ID), for instance, associated with a type of pipe. The piping identification may identify and be associated with various piping data, such as a size 54, material 56, shape, function (e.g., reducer), model, manufacturer, or the like, of a pipe. For instance, the field for the Pipe ID 46 may list X numbers (e.g., GE piping identification numbers) that are associated with a size 54 and a material 56.

The processor 24 may receive a user selection of a point type 60 from the tool 40 of the graphical interface 20. The processor 24 may utilize the point type 60 to determine whether the point is associated with a run (e.g., straight pipe, elbow, flange, etc.) or branches (e.g., tee). The point type 60 field may be a drop down list or other method suitable for selecting the type of point to be added and/or modified. The values (e.g., run and/or tee) of the point type 60 field may be preset so that a user simply selects run or tee.

Additionally, the processor 24 may access user selections (e.g., signals) received from the graphical interface 20 along with the mouse 32, keyboard 30 (e.g., arrow keys), or any suitable method of input. The user selections may be related to locations of the pipe segment of the 3D piping model 18. The processor 24 may determine a point 62 associated with a route 64 (e.g., utilize the points 62 to create a route 64) of the pipe segment. The route 64 may include one or more points 62 and may identify data associated with the 3D piping model 18 that is important for analysis (e.g., point location, point type, X number etc.). The processor 24 may create the point 62 based on user selections, from the mouse and/or a capacitive touchscreen, of a portion (e.g., selecting a centerline point of a pipe segment) of the 3D piping model 18. The points 62 and/or route 64 may be based on the user selections related to the location, the Pipe ID 46, the segment, the point type 60, or other suitable user selections for creating a route 64. As explained below, the processor 24 is configured to generate a representation (e.g., the second set of data 34) of the route 64 to be stored in a second format 36, wherein the second format 36 is associated with piping analysis. The processor 24 may generate an indication of the point 62 in a table 66 discussed below.

Further, the processor 24 may insert, alter, or remove points of the route associated with the tool 40. The tool 40 may include insert point, delete point, modify point, select point (e.g., choose point) controls, buttons, or the like. This may enable a user to make user selections for the processor 24 to make edits to mistakes based on the user selections related to piping analysis.

The processor 24 may generate information related to the route 64 to display in a table 66 (e.g., summary sheet). As the user makes user selections with the graphical interface 20, the processor 24 may access the user selections received and generate summary data of the route 64 based on the user selections. The processor 24 may output the summary data to the graphical interface 20, as shown in the table 66. For instance, the table 66 includes a segment name 68. Specifically, the segment name 68 may be based on the user selection of the segment name 44 chosen when the start new cycle 42 button was clicked. The processor 24 may receive the segment name 44 associated with the user selection and generate the segment name 68, an abbreviation, or similar identification in the table 66.

The processor 24 may determine a point 62 associated with a route 64 of the pipe segment. The point 62 may include a location, a point type 78, and a Pipe ID 46. The processor 24 may output a point name 70 to the table 66. The point name 70 may be a generated unique identifier, a name entered by the user, or a combination of different fields (e.g., location and Pipe ID 46). The processor 24 may receive a user selection of a location of the pipe segment of the 3D piping model 18. The processor 24 may determine coordinates (e.g., Cartesian coordinates) of the location, and the processor 24 may generate data to output to the table 66 of the graphical interface 20. Accordingly, the processor 24 may generate an X coordinate 72, a Y coordinate 74, and a Z coordinate 76 associated with a point 62 of the route 64 onto the graphical interface 20. As mentioned above, a point 62 may include a type (e.g., run or tee) which may be displayed in the table 66 as the point type 78. Additionally, the segment number 80 (e.g., X number) may identify the Pipe ID 46 associated with the piping segment. The coordinates may identify centerline points of the 3D piping model 18. By knowing the location of the point 62 in the center of the pipe and the geometry (e.g., diameter, shape, or size 54) associated with the points 62, the processor 24 may generate a representation of the route 64 in the second format 36. As shown in FIG. 2, the processor 24 may be configured to store (e.g., save) the second set of data 34 as a file by entering a file name 82 and/or a folder name 84.

As an example, a user may select start a new cycle/segment/route. The processor 24 may access this user selection and create a new empty route 64. The user may then select a Pipe ID 62 and a point type 60. The user may continue and select location A of the 3D piping model 18. The processor 24 may access a user selection received of the Pipe ID 62, the point type 60, and the location A. The processor 24 may then determine a point 62 at A and associate that point with the route 64 of the pipe segment. The processor 24 may determine the data in the table 66 associated with point 62 A, such as the coordinates (e.g., X=2, Y=4, Z=1), the point type (e.g., RUN), and the segment number (e.g., X number). The route 64 may then include point 62 A and the data associated with point A. Further, the processor 24 may be configured to generate the point 62 A and the associated data in the table 66. Next, a user may continue by selecting location B of the 3D piping model 18. Similarly, the processor 24 may access the user selection related to the location B. The processor 24 may then determine a second point 62 at B and associate that point with the route 64 in the order in which the points were chosen. Accordingly, the processor 24 may output an indication of the point 62 at B and the data associated with B (e.g., X=1, Y=4, Z=1) in the table 66. This process may occur similarly for point C.

The processor 24 may proceed to access a user selection received with a TEE point type 60 at location D and a different Pipe ID 46. The processor 24 may then continue and determine the point 62 at D. The point 62 at D may be an anchor point that indicates where a first branch (e.g., locations D-E-F) and a second branch (e.g., locations D-G) split. Accordingly, the point type 60 may be used to identify a number of branches at the point 62. The processor 24 may determine point D and associate point D to the route 64, similar to points 62 at A, B, and C discussed above. The processor 24 may generate an indication of the point 62 at D in the table 66.

After having a tee as the point 62 at D, the processor 24 may continue to complete the first branch. Accordingly, the processor 24 may receive information related to a point 62 at E followed thereafter by point F. Once the processor 24 completes the process for the first branch, the processor 24 may access a user selection received from the user that indicates a start of a new cycle. The processor 24 may then determine points 62 associated with the second branch during the second cycle. For instance, the processor 24 may receive a user selection of location D associated with the anchor point, followed by a user selection of location G. The processor 24 may determine points 62 associated with the route 64. Once all the desired points 62 are included in the route 64 and/or on the table 66, the processor 24 may generate a representation of the route 64 to be stored in a second format 36, wherein the second format 36 is associated with piping analysis.

Figure 3:
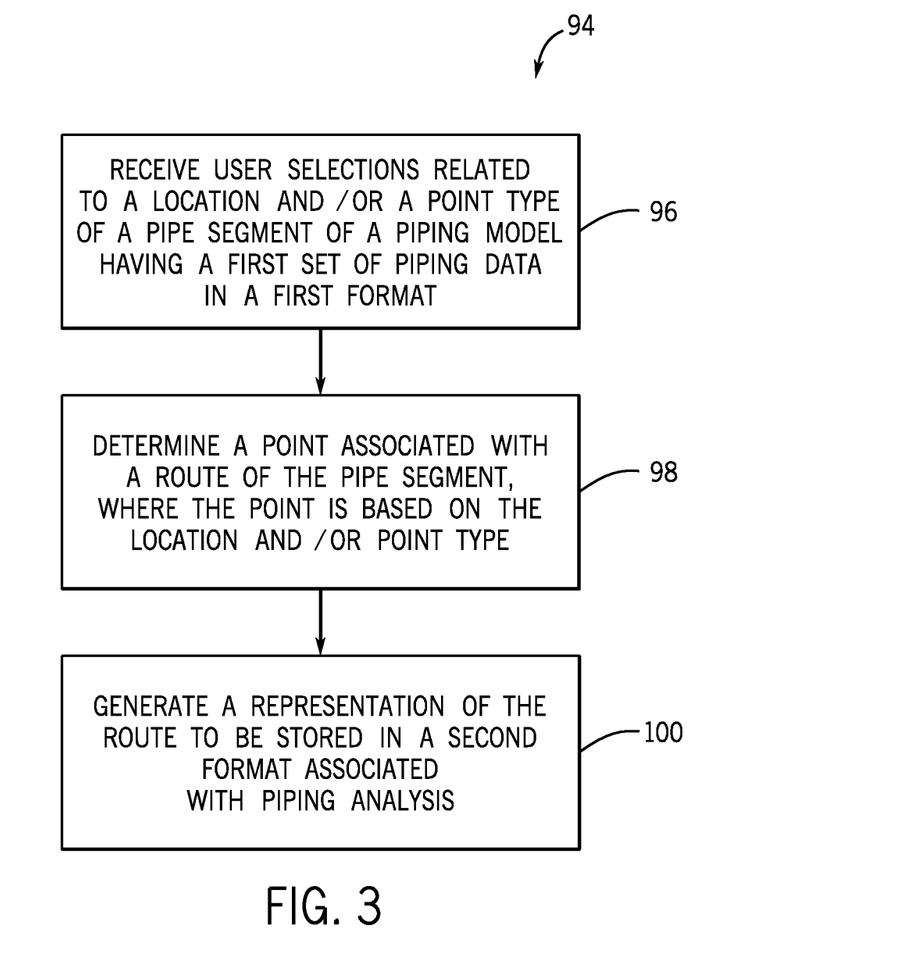
FIG. 3 is a flow chart of a process utilizing the processor of FIG. 1, in accordance with an embodiment of the present disclosure.

FIG. 3 is a flow chart of a process 92 performed by the processor 24 (e.g., running code) to enable piping analysis of the 3D piping model 18. The process 92 may be stored in the memory 16 of the system 10 and executed as instructions by the processor 24. The processor 24 may begin by accessing user selections received from the user related to a location and/or a point type of a pipe segment of a 3D piping model 18 having a first set of piping data 12 in a first format 14 (block 96). More specifically, the user selections may be selections of locations of centerline points of the piping model 18. Alternatively and/or additionally, the user selections may be point type 60 selections based on the number of branches at the location of the pipe segment. Further, the user selections may include a Pipe ID 46 selection configured to identify a material and/or pipe size of the pipe segment utilized at the location.

Next, the processor 24 may continue by determining a point 62 associated with a route 64 of the pipe segment, where the point 62 is based on the location and/or point type (block 98). The route 64 may be an ordered/unordered list of one or more points 62 and the information corresponding to each point 62, as described above. For instance, the route 64 may include the information in the table 66 from FIG. 2. The route 64 may correspond to a second set of data 34 that allows an analysis of the pipe segment (e.g., includes pipe size, material, and point locations) to be performed by analysis software.

The processor 24 may then proceed by generating a representation of the route to be stored in the second format associated with piping analysis (block 100). For instance, as described in the text related to FIG. 3, the processor 24 may create a .NTL file for AutoPIPE. The .NTL file may include a representation of the route 64. The representation of the route 64 may include the information desired when performing piping analysis.

Figure 4:
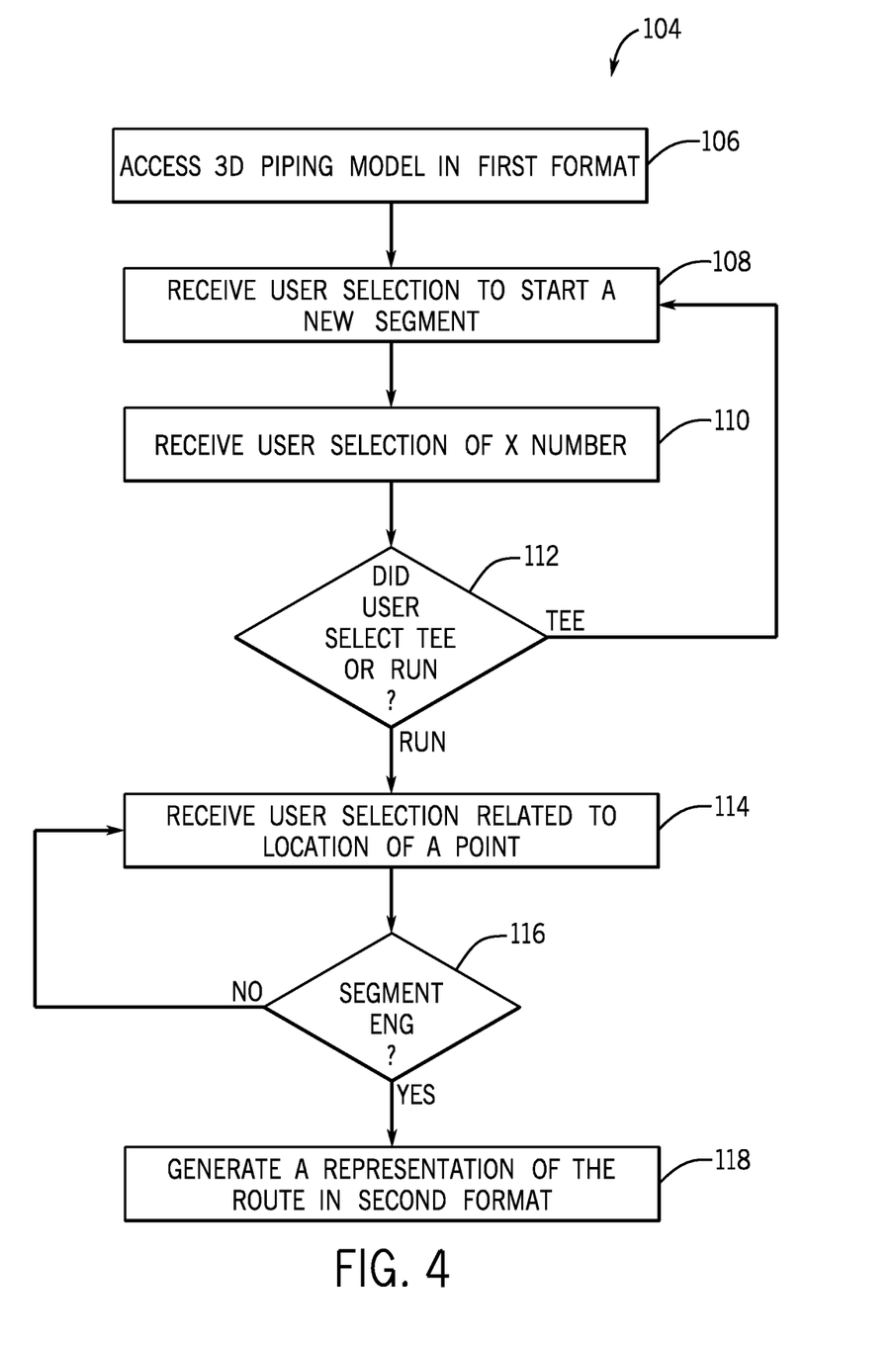
FIG. 4 is a flow chart of another process utilizing the processor of FIG. 1, in accordance with an embodiment of the present disclosure.

FIG. 4 is a flow chart of a process 86 performed by the processor 24 (e.g., running code) for a user to create the second set of data 34 (e.g., a representation of the route 64 in a second format 36). The process 86 may be stored in the memory 16 of the system 10 and executed as instructions by the processor 24. The processor 24 may begin by accessing the 3D piping model in the first format 14 (block 106). The processor 24 may continue by accessing a user selection received from the user relating to starting a new segment/cycle (block 108). The processor 24 may then proceed to access a user selection of an X number (block 110), Pipe ID, or other identifying information regarding the type of piping. Once the identifying information is selected, the processor may receive a user selection related to the point type 60 (diamond 112), where the point type 60 is configured to identify a number of branches at the point 62. As explained above, a tee may include a first branch and a second branch. A run may continue and have just the branch that the pipe continues through. If the point type 60 is a tee, the processor 24 may proceed by receiving another user selection of a new segment (block 108). If the point type 60 is a run, the processor 24 may receive a user selection related to a location of a point 62 (block 114). The processor 24 may then access the user selection and determine a point a point 62 associated with the route 64, as explained above. The processor 24 can proceed to receive user selections and determine additional points until the segment ends (diamond 116). Next, the processor 24 may generate a representation of the route 64 in a second format (block 118). The processor 24 may store (e.g., save) the representation (e.g., data associated with the points 62 in the table 66 that describes route 64) in the second format 36, such as saving the second set of data 34 of the route 64 as a .NTL file to the memory 16. As such, the .NTL file may then be opened in AutoPIPE.

To illustrate the process 86 of FIG. 4, the steps are performed as an example with respect to the 3D piping model 18 of FIG. 2 after the model 18 is loaded (block 106). With respect to points 62 at locations A-C of FIG. 2, the processor 24 may receive a user selection to start the segment (block 108) and an X number (block 110) associated with the pipe of the segment. Since A-B-C have a point type 60 of run (block 112), the processor may proceed to access user selections (block 114) that identify the locations A-B-C (e.g., the center of the pipe). These points 62 are then stored with the information suitable for performing piping analysis (e.g., location, point type 78, segment number 80, etc.). As shown with locations A-C of FIG. 2, the processor 24 may allow multiple run points 62 to be selected if there are elbows (e.g., location B) or bends in the 3D piping model 18. Once the processor 24 determines the data associated with the points 62 created at locations A-C, the user may then add a tee point 62 at location D. The processor 24 may determine the tee point 62 associated with the route 64, for instance, by changing the point type 60 to tee and selecting an anchor point 62 at location D. The anchor point may indicate where a first branch and a second branch split. For instance, a first branch runs through locations D-E-F, and a second branch runs through locations D-G. The branches split at the anchor point 62 at location D.

Once the points 62 of the first branch of locations D-E-F is completed, the user may end the segment (diamond 116) so that the user may add one or more branches (e.g., second segment) to any tees that were added on the first segment. For instance, after points 62 at locations A-F are added by the processor 24, the processor may access user selections received that indicate starting a new segment (block 108). A second segment (e.g., points 62 at locations D-G) may be added by again selecting an X number (block 110), selecting run (diamond 112), selecting the point 62 at location G (block 114), and ending the segment (diamond 116). As each point 62 is added, information may be added to the route 64 and the table 66. Once points 62 A-G are added to the table 66, the information that is needed to describe route 64 for piping analysis is completed.

Technical effects of the present embodiments may include generating a set of data that enables piping analysis of a piping model. In certain embodiments, the system may generate a file in a file format that enables a piping model to be analyzed using analysis software. For example, a user may have a piping model in a format that is missing piping data expected for performing piping analysis. Technical effects of the present embodiments may include transforming a pipe segment of a piping model in a first format to a route having points in a second format for an analysis of the piping model. In some embodiments, the system can determine a route of points that identifies the data expected in piping analysis. In this way, the system avoids rebuilding a separate analysis model and, by extension, reduces time consumed by determining the expected piping data for piping analysis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer-readable medium having computer executable code stored thereon, the code comprising instructions to:
   access, via a processor, a first set of data comprising a piping model, wherein the first set of data is stored having a first data file format, wherein the first data file format comprises a .prt file format, and wherein the first data file format is utilized in conjunction with a pipe modeling program;
   display, via a graphical interface, the piping model and a point creator tool, wherein the point creator tool is configured to display user selectable fields associated with at least one point of the piping model;
   access, via the processor, a first user selection of a location of a point of the piping model;
   access, via the processor, a second user selection of a point type of the point from the point creator tool, wherein the point type is based on a number of branches of the piping model at the location of the point;
   store an indication of the point, wherein the indication of the point comprises the location and the point type of the point, and wherein the indication of the point is displayed via the point creator tool;
   generate, via the processor, a second set of data comprising a representation of a route from the indication of the point and an indication of at least one additional point, wherein the route comprises the point, the at least one additional point, and a path connecting the point and the at least one additional point, and wherein the representation of the route comprises additional information for performing piping analysis; and
   store, via the processor, the second set of data comprising the representation of the route in a second file format, wherein the second data file format comprises a .NTL file format, wherein the second file format is configured to be opened in a piping analysis program.

2. The non-transitory computer-readable medium of claim 1, wherein the location of the point is along a centerline of the piping model.

3. The non-transitory computer-readable medium of claim 1, wherein the point is associated with a pipe identification that corresponds to a type of piping used at the point.

4. The non-transitory computer readable medium of claim 1, wherein the pipe identification is associated with a piping material and a piping size to be utilized by the piping analysis program.

5. The non-transitory computer-readable medium of claim 4, wherein the route comprises an order of the points.

6. The non-transitory computer-readable medium of claim 1, wherein the point type is a tee and the point is an anchor point that identifies where a first branch and a second branch occur.

7. The non-transitory computer-readable medium of claim 1, wherein instructions comprise instructions to generate a table of the points.

8. A method, comprising:
   accessing, via a processor, a first set of data comprising a piping model, wherein the first set of data is stored having a first data file format, wherein the first data file format comprises a .prt file format, and wherein the first data file format is utilized in conjunction with a pipe modeling program;
   displaying, via a graphical interface, the piping model and a point creator tool, wherein the point creator tool is configured to display user selectable fields associated with at least one point of the piping model;
   accessing, via the processor, a first user selection of a location of a point of the piping model;
   accessing, via the processor, a second user selection of a point type of the point from the point creator tool, wherein the point type is based on a number of branches of the piping model at the location of the point;
   storing, via the processor, an indication of the point, wherein the indication of the point comprises the location and the point type, and wherein the indication of the point is displayed via the point creator tool;
   generating, via the processor, a second set of data comprising a representation of a route from the indication of the point and an indication of at least one additional point, wherein the route comprises the point, the at least one additional point, and a path connecting the point and the at least one additional point, and wherein the representation of the route comprises additional information for performing piping analysis; and
   storing, via the processor, the second set of data comprising the representation of the route in a second file format, wherein the second data file format comprises a .NTL file format, wherein the second file format is configured to be opened in a piping analysis program.

9. The method of claim 8, comprising determining the route based at least in part on a diameter of the piping model at the location of the point, wherein the location of the point is a centerline of the piping model.

10. The method of claim 8, wherein the point type is a tee, wherein the tee comprises a first branch and a second branch.

11. The method of claim 8, comprising accessing, via the processor, a pipe identification associated with the point from the point creator tool.

12. The method of claim 11, wherein the pipe identification identifies a size of the piping model.

13. The method of claim 12, wherein the point is associated with an X number as the pipe identification.

14. An electronic device, comprising:
   a graphical interface configured to display a piping model and a point creator tool, wherein the point creator tool comprises user selectable fields associated with at least one point of the piping model;

a processor communicatively coupled to a memory, wherein the processor is configured to:
  access a first set of data comprising the piping model, wherein the first set of data is stored having a first data file format, wherein the first data file format comprises a .prt file format, and wherein the first data file format is utilized in conjunction with a pipe modeling program;
  access a first user selection from the graphical interface of a location of a point of the piping model;
  access a second user selection from the point creator tool of a point type of the point, wherein the point type is based on a number of branches of the piping model at the location of the point;
  store an indication of the point, wherein the indication of the point comprises the location and the point type of the point, and wherein the indication of the point is displayed via the point creator tool;
  generate a second set of data comprising a representation of a route from the indication of the point and an indication of at least one additional point, wherein the route comprises the point, the at least one additional point, and a path connecting the point and the at least one additional point, and wherein the representation of the route comprises additional information for performing piping analysis; and
  store the second set of data comprising the representation of the route in a second file format, wherein the second data file format comprises a .NTL file format, wherein the second file format is configured to be opened in a piping analysis program.

15. The electronic device of claim 14, wherein the location of the point is along a centerline of the piping model.

16. The electronic device of claim 14, wherein the graphical interface is configured to display a table associated with the route.

17. The electronic device of claim 14, wherein the point comprises an X number that corresponds to a type of piping used at the point.

* * * * *